United States Patent [19]

Ammeraal

[11] Patent Number: 4,676,364
[45] Date of Patent: Jun. 30, 1987

[54] CONVEYING DEVICE

[75] Inventor: Thomas C. M. Ammeraal, Wormer, Netherlands

[73] Assignee: Weimar N.V., Curacao, Netherlands

[21] Appl. No.: 818,739

[22] Filed: Jan. 14, 1986

[30] Foreign Application Priority Data

Jan. 17, 1985 [NL] Netherlands ............. 8500103

[51] Int. Cl.⁴ ............................................. B65G 67/60
[52] U.S. Cl. ..................... 198/799; 198/586; 414/139
[58] Field of Search ...................... 198/586, 799; 414/137.78, 139.79, 140

[56] References Cited

U.S. PATENT DOCUMENTS

| 3,077,270 | 2/1963 | Laan et al. | 198/586 X |
| 3,684,079 | 8/1972 | Kuehl | 198/799 |
| 3,732,970 | 5/1973 | Nakanishi et al. | 198/799 |
| 4,440,537 | 4/1984 | Blattermann et al. | 414/139 |
| 4,443,148 | 4/1984 | Arnemann | 414/139 |
| 4,459,077 | 7/1984 | Franke | 414/139 |

FOREIGN PATENT DOCUMENTS

| 2024775 | 5/1970 | Fed. Rep. of Germany . |
| 6400015 | 2/1965 | Netherlands . |
| 1277140 | 6/1970 | United Kingdom . |

Primary Examiner—Joseph E. Valenza
Assistant Examiner—Lyle Kim
Attorney, Agent, or Firm—Pahl, Lorusso & Loud

[57] ABSTRACT

The invention relates to a conveying device comprising a platform conveyor, which is provided with a plurality of rectangular platforms, each being flexible in one direction, and with two pairs of endless chains, the pairs being connected to the corners at the front and rear side, respectively, of the platforms and being led over pairs of aligned guide sprockets, the chains extending substantially parallel to each other and guiding the platforms in a substantially horizontal position from a load point to an unload point through a transport part and bringing them back through a return part, the transport part including a section having a substantial vertical component. According to the invention the platform conveyor includes a substantially horizontal section near the load or unload point, and at this load or unload point the platform conveyor is connectively coupled to an unload or load point of a similar second platform conveyor, the load or unload point thereof being lockable at a fixed level, the substantially horizontal sections of both platform conveyors, which are connected to each other, together being adjustable in the vertical direction, and during the height adjustment the connecting point of both platform conveyors is movable in the substantially horizontal direction.

6 Claims, 3 Drawing Figures

CONVEYING DEVICE

The invention relates to a conveying device comprising a platform conveyor, which is provided with a plurality of rectangular platforms, each being flexible in one direction, and with two pairs of endless chains, the pairs being connected to the corners at the front and rear side, respectively, of the platforms and being led over pairs of aligned guide sprockets, the chains extending substantially parallel to each other and guiding the platforms in a substantially horizontal position from a load point to an unload point through a transport part and bringing them back through a return part, the transport part including a section having a substantial vertical component.

Such conveying device is already known and is used for vertically transporting goods, of which the lower surface must be kept at all times in a horizontal position, such as is for example the case with goods piled up on pallets.

In this known conveying device the height between the upper load or unload point and the lower unload or load point is fixed.

However, in practice situations occur, wherein variations in height between the load and unload point would be very desirable, for example in loading and unloading of ships. Preferably it should be possible that this loading and unloading of ships can be carried out at different levels.

Furthermore, the loading ratio of the ship influences the draught thereof, so that when the ship is being loaded or unloaded respectively, it will go down or up respectively.

Besides, an additional variation in the difference in height arises in harbours where a tide prevails.

When the known conveying device is utilized these variations have to be compensated by adjusting the height of the whole conveying device supported by the quay and therefore, also of the load or unload point respectively lying at the side of the quay, which is, however, onerous.

It is an object of the present invention to provide a conveying device of the kind mentioned in the preamble, wherein this disadvantage is removed in an efficient way.

For this purpose the conveying device according to the invention is characterized in that the platform conveyor includes a substantially horizontal section near the load or unload point, and at this load or unload point the platform conveyor is connectively coupled to an unload or load point of a similar second platform conveyor, the load or unload point thereof being lockable at a fixed level, the substantially horizontal sections of both platform conveyors, which are connected to each other, together being adjustable in the vertical direction, and during the height adjustment the connecting point of both platform conveyors is movable in the substantially horizontal direction.

Hereby an adjustment for height of the substantially horizontal parts of both platform conveyors along a certain distance will result in a transposition of the unload or load point lying at the free end of the first platform conveyor along a distance twice as much, when the load or unload point at the free end of the second platform conveyor is being locked at a fixed level.

Consequently it is possible to realize a large reach of height adjustment in a simple way, while the substantially horizontal section of the conveying device can convey the loads to be transported directly above the quay without additional conveyors.

In a favourable embodiment of the conveying device the substantially horizontal sections of both platform conveyors are accommodated in a bridge, which is adjustable in the upward direction and which also guides the substantially horizontal movement of the connecting point.

Hereby the adjustable bridge near its centre can be guided in the vertical direction by a tower, which carries at its upper side two arms, which extend parallel to the bridge and to which adjustable cables are connected which engage the bridge.

The invention will hereafter be elucidated with reference to the drawings, which show an embodiment of the conveying device according to the invention.

Figure 1:
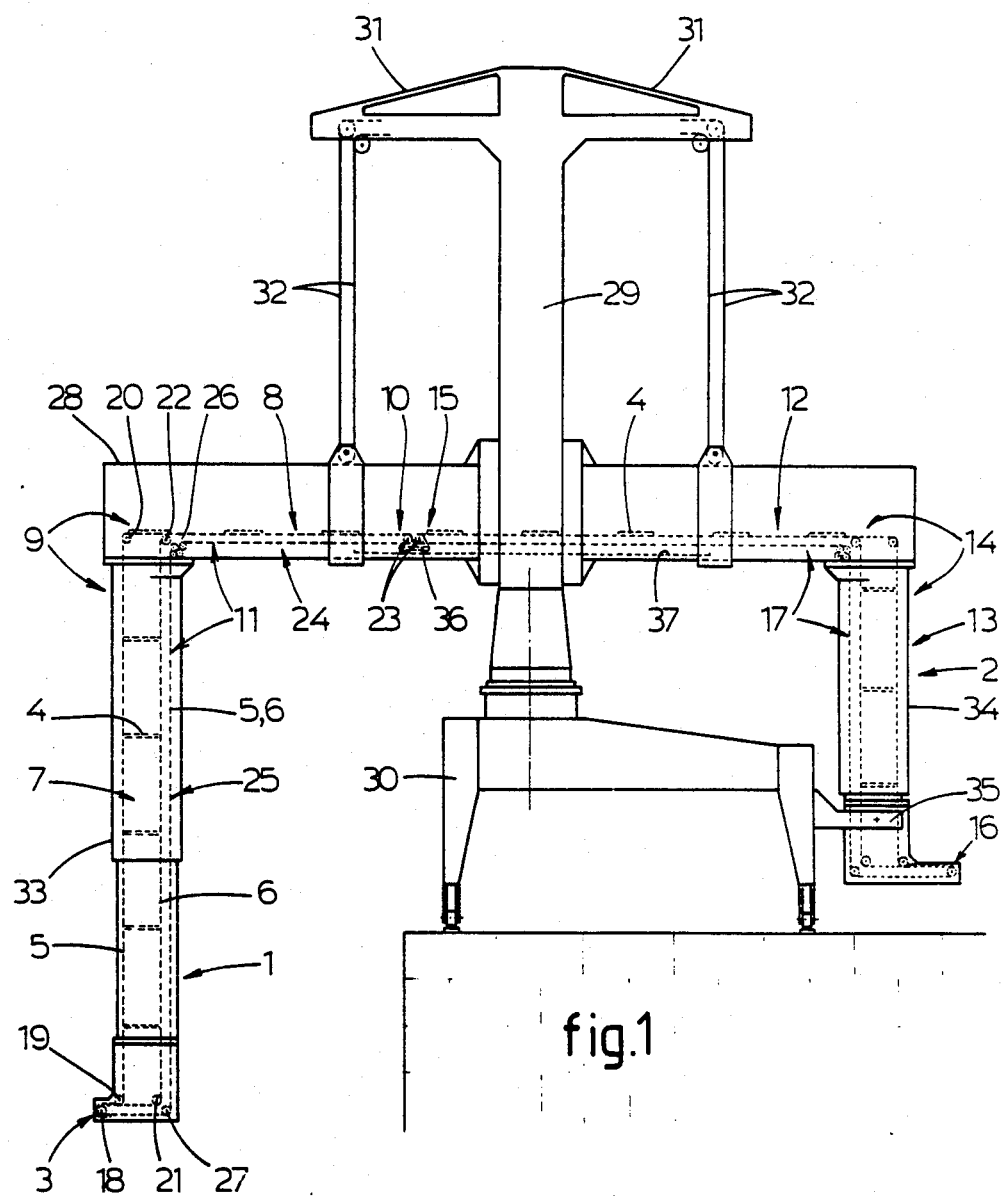
FIG. 1 is a side view of an embodiment of the conveying device according to the invention.

The drawings show an embodiment of a conveying device, which is provided with two coupled platform conveyors 1 and 2. A lower unload or load point 3 of the platform conveyor 1 must be introduceable into, for example the hold of a ship which has to be loaded or unloaded and is adjustable in the vertical direction, while a lower load or unload point 16 of the platform conveyor 2 is locked at a fixed height.

Hereinafter the operation of the conveying device will be elucidated with reference to the situation, wherein a ship is being unloaded and therefore the lower unload or load point 3 of the platform conveyor 1 serves as a load point, while the loads to be transported are conveyed from the platform conveyor 1 to the platform conveyor 2 and are carried off at the lower load or unload point 16 in this case serving as an unload point. Naturally, the movements of the conveying device are effected in the reverse sense when the ship is being loaded.

Each platform conveyor 1, 2 respectively has equally spaced apart platforms 4, which are each connected with their front and rear side respectively to two pairs of endless chains 5 and 6 respectively of equal length.

The platforms 4 are constructed in such way, that they are flexible in one direction, so that the platforms 4 can be deflected during their circulation in the conveying device. During the transport of a load each platform 4 acts as a rigid platform.

The chain pairs 5 and 6 respectively are being led over a plurality of further specified guide sprocket pairs and guide the platforms 4 in a continuous movement along a circulating path.

The platform conveyor 1 conducts the platforms 4 through a vertical section 7 and a horizontal section 8 of a transport part 9 from the lower load point 3 to an upper load or unload point 10 in this case acting as an unload point, while the platforms 4 are brought back again through a return part 11.

The platforms 4 of the platform conveyor 2 are conducted from an upper unload or load point 15, here acting as a load point to the lower unload point 16 through a horizontal section 12 and a vertical section 13 of a transport part 14, while a return part 17 brings the platforms 4 back again. Herein the upper unload point 10 of the platform conveyor 1 and the upper load point 15 of the platform conveyor 2 are connected to each other, so that the loads to be transported can be transferred there.

At the lower load point 3 of the platform conveyor 1 the platforms 4 are deflected to the horizontal transport position through aligned pairs of guide sprockets 18, whereby the loads to be transported can be supplied to the platform 4. In the vertical section 7 of the transport part 9 the chain pair 5 and the chain pair 6 follow different paths. The chain pair 5 is conducted along the guide sprocket pairs 19 and 20, while the chain pair 6 is led over the guide sprocket pairs 21 and 22. In this way, the platforms 4 extending between the chain pairs 5 and 6 are conveyed vertically in the upward direction in a horizontal position.

At the guide sprocket pairs 20 and 22 the vertical section 7 of the transport part 9 passes into the horizontal section 8 and the chain pairs 5 and 6 are led together to the aligned guide sprocket pairs 23 of the upper unload point 10. Here the platforms 4 are deflected, whereby the loads are transferred to the platform conveyor 2.

After the loads have been delivered, the platforms 4 of the platform conveyor 1 are brought back again to the lower load point 3 through a horizontal section 24 and a vertical section 25 of the return part 11. At the transition of the horizontal section 24 and the vertical section 25 guide sprocket pairs 26 are disposed, which conduct the platforms 4 in the direction oppositely to the direction of flexibility. This is possible, because during this guiding the platforms 4 can sag down in the direction of flexibility. Finally aligned guide sprocket pairs 27 conduct the chain pairs 5 and 6 back again to the guide sprocket pairs 18 of the lower load point 3.

A circulation of the platforms 4 of the platform conveyor 2 is effected in the same way as in the platform conveyor 1, but always in the opposite direction. Both platform conveyors 1 and 2 co-operate in such way, that, when a platform 4 of the platform conveyor 1 arrives at the upper unload point 10 through the transport part 9, a platform 4 of the platform conveyor 2 just leaves at the upper load point 15 through the horizontal section 12 of the transport part 14. At that time the loads supported by the platforms 4 can be transferred from the platform conveyor 1 to the platform conveyor 2.

The horizontal sections 8 and 12 respectively of both platform conveyors 1 and 2 respectively are accommodated in a bridge 28, which is displaceably guided in the vertical direction by a tower 29, which is placed on a mobile underframe 30. The tower 29 has near its upper side transverse arms 31, which extend parallel to the bridge 28 and to which cables 32 are connected, the cables 32 being adjustable by a motor (not shown) and engaging the bridge 28. These cables 32 serve for the height adjustment of the bridge 28 along the tower 29.

The sections 7, 13 respectively of both platform conveyors 1, 2 respectively are accommodated in telescoping tubes 33, 34 respectively, which are connected at their upper sides to the bridge 28.

The lower unload point 16 of the platform conveyor 2 can be locked in the vertical direction by a locking means 35, which is mounted to the underframe 30.

The guide sprocket pairs 23 at the end of the horizontal sections 8, 12 respectively of the platform conveyors 1, 2 respectively are disposed on a mobile carriage 36, which is supported by a guiding 37 of the bridge 28. Hereby the joint between the platform conveyors 1 and 2 is achieved.

When the bridge 28 is in its lower position, the lower load point 3 is also placed in its lower position. The mobile carriage 36 is then in its extreme position to the left, e.g. to the side of the platform conveyor 1.

When the bridge 28 is moved upwardly along a certain distance by the cables 32, the lower load point 3 moves upwardly along a distance twice as much. This is a result of the fact, that the lower unload point 16 is locked at a fixed height. Hereby the distance between the bridge 28 and the lower unload point 16 increases. Therefore, the length of the vertical section 13 of the platform conveyor 2 will have to increase, which is realized by accordingly decreasing the length of the horizontal section 12 of the platform conveyor 2. For this purpose the mobile carriage 36 moves horizontally along the same distance as the vertical displacement of the bridge 28 in the direction of the vertical section 13 of the platform conveyor 2, whereby a part of the horizontal section 12 passes into the vertical section 13 of the platform conveyor 2.

Because the mobile carriage 36 moves away from the vertical section 7 of the platform conveyor 1 the horizontal section 8 of the platform conveyor 1 becomes larger and the vertical section 7 thereof becomes accordingly shorter, whereby the lower load point 3 obtains an additional upward displacement along with the displacement resulting from the movement of the bridge 28.

In the upper position of the bridge 28 the mobile carriage 36 is moved maximally to the right and the lower load point 3 of the platform conveyor 1 is pulled up maximally.

When the bridge 28 is displaced downwardly again along a certain distance, the carriage 36 moves along the same distance in the direction of the vertical section 7 of the platform 1, so that the lower load point 3 moves along a distance twice as much.

Figure 3:
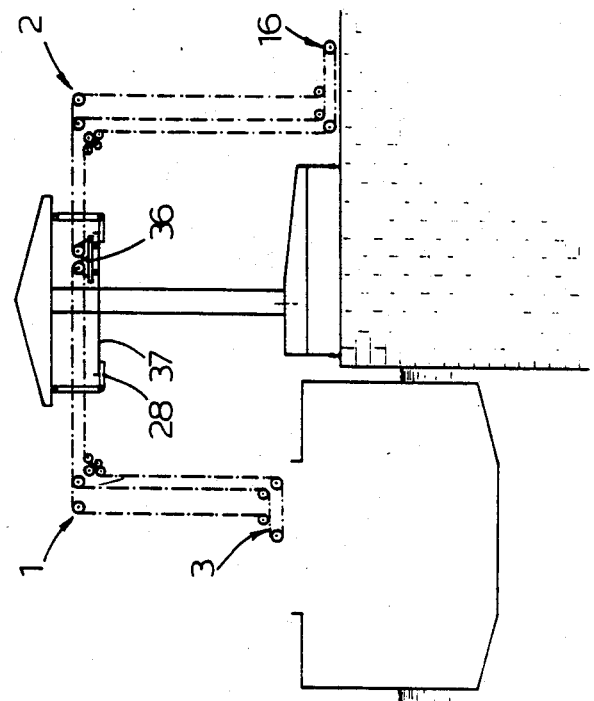
FIG. 3 is a schematic side view of the conveying device of FIG. 1 in a high position and on a reduced scale.
Figure 2:
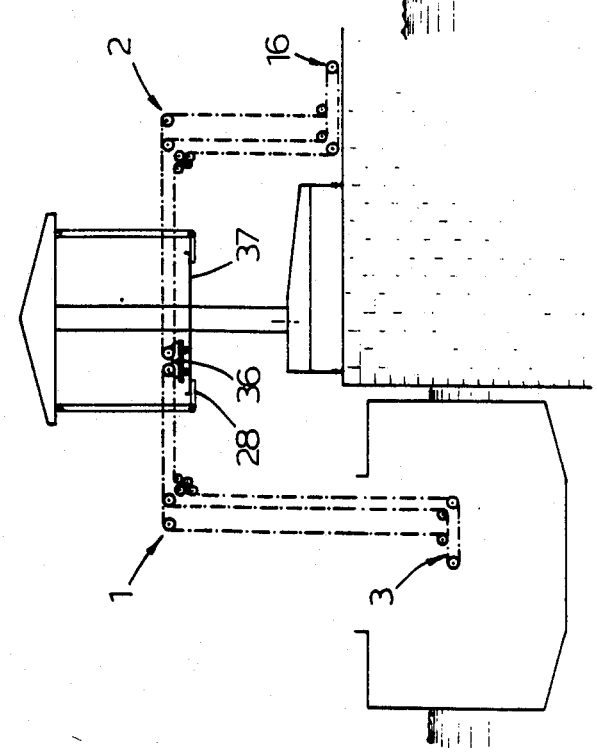
FIG. 2 is a schematic side view of the conveying device of FIG. 1 in a low position and on a reduced scale.

The reach of adjustment of the lower load point 3 has to be such, that when dealing with a fully loaded and therefore deep-drawing ship and a low water level (FIG. 2), the lower unload or load point 3 can still be brought into the hold of the ship, and when dealing with an empty ship and a high water level (FIG. 3) the lower unload or load point 3 can still be lifted above the hold of the ship.

As is already stated hereinbefore, the operation of the conveying device is described with reference to the situation wherein a ship is being unloaded.

When a ship is being loaded, the platform conveyors 1 and 2 circulate in the opposite direction. In this case the lower load or unload point 16 of the platform conveyor 2 acts as load point, while the upper unload or load point 15 of the platform conveyor 2 serves as unload point, where the loads to be transported are transferred to the load or unload point 10 of the platform conveyor 1, which acts as load point. In this case the lower unload or load point 3 is the unload point of the platform conveyor 1.

The invention is not restricted to the embodiment shown in the drawing by way of example, which can be varied in different ways within the scope of the invention.

I claim:

1. A conveying device comprising a platform conveyor, which is provided with a plurality of rectangular platforms, each being flexible in one direction, and with two pairs of endless chains, the pairs being connected to the corners at the front and rear side, respectively, of the platforms and being led over pairs of aligned guide sprockets, the chains extending substantially parallel to each other and guiding the platforms in a substantially horizontal position from a first load point to a first unload point through a transport part and bringing the platforms back through a return part, the transport part including a section having a substantially vertical component, the platform conveyor includes a substantially horizontal section near the first unload point, and at this first unload point the platform conveyor is connected by coupling means to a second load point of a similar second platform conveyor, the second platform conveyor including a second unload point which is lockable at a fixed level, the substantially horizontal sections of both platform conveyors, which are connected to each other at the first unload and second load point by the coupling means, together being adjustable in the vertical direction, and during the height adjustment the connecting point of both platform conveyors is moved in the substantially horizontal direction.

2. A conveying device as claimed in claim 1, wherein the upper load or unload point of the first platform conveyor is coupled to the upper unload or load point of the second platform conveyor so that the platform conveyors are coupled to each other at upper ends of the platform conveyors.

3. A conveying device as claimed in claim 1, wherein the substantially horizontal sections of both platform conveyors are accommodated in a bridge which is adjustable in the vertical direction, and which also guides the substantially horizontal displacement of the connecting point.

4. A conveying device as claimed in claim 3, wherein the coupling means includes guide sprocket pairs of the first unload point of the first platform conveyor facing away from a free end thereof and guide sprocket pairs of the second load point of the second platform conveyor facing away from a free end thereof coupled to a mobile carriage supported by the bridge.

5. A conveying device as claimed in claim 3, wherein the adjustable bridge near its center is guided in the vertical direction by a tower, which carries at its upper side two arms, which extend parallel to the bridge and to which adjustable cables are connected, which engage the bridge.

6. A conveying device as claimed in claim 1 wherein the platform conveyors are reversibly drivable, whereby the first load point becomes an unloading point, the first unloading point becomes a loading point, the second loading point becomes an unloading point, and the second unloading point becomes a loading point.

* * * * *